United States Patent
Bennett et al.

(10) Patent No.: US 8,732,034 B1
(45) Date of Patent: *May 20, 2014

(54) METHOD, MEDIUM, AND SYSTEM FOR PROVIDING LEADS TO AN AGENT IN EXCHANGE FOR CREDITS

(71) Applicant: West Corporation, Omaha, NE (US)

(72) Inventors: Rodney L. Bennett, Omaha, NE (US);
Mark J. Pettay, Omaha, NE (US);
Kenneth A. Marr, Ashland, NE (US);
Rodney J. Kempkes, Omaha, NE (US);
David C. Mussman, Omaha, NE (US);
James V. Frisbie, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/913,557

(22) Filed: Jun. 10, 2013

Related U.S. Application Data (63) Continuation of application No. 13/342,601, filed on Jan. 3, 2012, now Pat. No. 8,473,366, which is a continuation of application No. 11/857,544, filed on Sep. 19, 2007, now Pat. No. 8,112,321.

(60) Provisional application No. 60/886,227, filed on Jan. 23, 2007.

(51) Int. Cl.
*G06Q 30/00* (2012.01)

(52) U.S. Cl.
USPC .............. 705/26.35; 379/265.05; 379/265.11

(58) Field of Classification Search
USPC ........................ 705/26.35, 26.62, 26.7, 27.1;
379/265.05, 265.06, 265.11, 265.12, 379/266.1
See application file for complete search history.

(56) References Cited

U.S. PATENT DOCUMENTS

| | | | |
|---|---|---|---|
| 6,868,395 B1* | 3/2005 | Szlam et al. | 705/26.82 |
| 7,546,243 B2* | 6/2009 | Kapadia et al. | 705/1.1 |
| 2004/0143473 A1* | 7/2004 | Tivey et al. | 705/8 |
| 2004/0143484 A1* | 7/2004 | Kapadia et al. | 705/10 |
| 2006/0265259 A1* | 11/2006 | Diana et al. | 705/7 |

OTHER PUBLICATIONS

"Pay-per-click search engine marketing handbook", LULU 2005.*

* cited by examiner

*Primary Examiner* — Matthew Zimmerman (57) ABSTRACT

A system, method, and computer readable medium for authorization of independent agents for processing calls and distribution of calls to authorized agents are provided. An independent agent may purchase or otherwise acquire credits for leads related to commerce transactions. The credits may be maintained by a call center and accessed by a device responsible for routing calls to agents. Calls or other transactions leads may then be directed to the independent agent, and the independent agents credits may be deducted accordingly.

20 Claims, 4 Drawing Sheets

Figure 5

METHOD, MEDIUM, AND SYSTEM FOR PROVIDING LEADS TO AN AGENT IN EXCHANGE FOR CREDITS

CROSS-REFERENCE TO RELATED APPLICATIONS

This application is a continuation of and claims the benefit of U.S. patent application Ser. No. 13/342,601, filed Jan. 3, 2012, which is a continuation of U.S. patent application Ser. No. 11/857,544, filed Sep. 19, 2007, now issued U.S. Pat. No. 8,112,321, issued Feb. 7, 2012, which claims the benefit of provisional U.S. Patent Application Ser. No. 60/886,227, filed Jan. 23, 2007, each of which is incorporated by reference herein in its entirety.

FIELD OF THE INVENTION

The present invention is generally related to call center technologies and, more particularly, to mechanisms for providing commerce leads to independent agents.

BACKGROUND OF THE INVENTION

Telephone call processing and switching systems of many types are known in the art. Such systems are used in telemarketing operations, telephone-based information systems, financial and insurance service operations, and public service centers, to name but a few examples. Automated or semi-automated call centers are examples of such systems, including functional features such as automatic call distributors (ACD), interactive voice response (IVR or VRU) systems, and coordinated voice and data delivery.

For example, telemarketing is a well-known form of remote commerce, that is commerce wherein the person making the sale or taking the sales data is not in the actual physical presence of the potential purchaser or customer. In general operation, a prospective purchaser typically calls a toll-free telephone number, such as an 800 number. The number dialed is determined by the carrier as being associated with the telemarketer, and the call is delivered to the telemarketer's call center. A typical call center will have a front end with one or more VRU units, call switching equipment, an ACD, and several work stations having a telephone and computer terminal at which a live operator processes the call. The dialed number, typically taken automatically from the carrier through use of the dialed number identification service (DNIS), is utilized to effect a database access resulting in a "screen pop" of a script on the operator's computer terminal utilizing a computer telephone integration (CTI) network. In this way, when a prospective purchaser calls a given telephone number, a telemarketing operator may immediately respond with a script keyed to the goods or services offered. The response may be at various levels of specificity, ranging from a proffer of a single product, e.g., a particular audio recording, or may be for various categories of goods or services, e.g., where the dialed number is responded to on behalf of an entire supplier. Typically, the prospective purchaser is responding to an advertisement or other solicitation, such as a mail order catalog or the like, from which the telephone number is obtained.

One disadvantage of call centers known to the art is the capital expense involved in setting up and maintaining such call centers. Call centers typically require multiple VRU units, call switches, automatic call distributors, agent workstations, and the like. This equipment is relatively expensive to purchase and maintain. A further disadvantage of the known call centers is their underuse. A typical call center will have periods of time of peak use, and other periods of underuse. As a result, staffing of the call center is a challenge, and much of the equipment is left unused or underused for extended periods of time.

To alleviate the expense associated with call center infrastructure and personnel, telemarketing systems may accommodate remote agents or telemarketers. For example, a remote agent may be an employ of a call center, but may be communicatively coupled with a call center front end. Incoming calls received at the call center may be directed to the remote agent by various mechanisms. Accordingly, requisite call center infrastructure, such as personal computers, telephony equipment, and the like may be reduced by employing call center personnel remotely. In many instances, it may be desirable to employ contract or other independent agents to process calls inbound to a call center. Heretofore, no mechanisms have been provided for providing suitable authorization of an independent agent for processing calls, nor for effectively providing leads, such as commerce lead credits, to an to an independent agent.

Therefore, what is needed is a mechanism that overcomes these problems and limitations.

SUMMARY OF THE INVENTION

The present invention provides a system, method, and computer readable medium for authorizing independent agents for processing calls related to a commerce transaction and distributing the calls to authorized agents. An independent agent may purchase or otherwise acquire credits for leads related to commerce transactions. The credits may be maintained by a call center and accessed by a device responsible for routing calls to agents. Calls or other transaction leads may then be directed to the independent agent, and the independent agent's credits may be deducted accordingly.

In one embodiment of the disclosure, a method for providing commerce leads to an agent is provided. The method comprises identifying an independent agent that is available for processing a transaction, determining whether the independent agent is authorized to process the transaction, and in response to determining the independent agent is authorized, evaluating a credit balance associated with the independent agent to determine if the independent agent has a sufficient credit balance for processing the transaction.

In another embodiment of the disclosure, a computer-readable medium having computer-executable instructions for execution by a processing system, the computer-executable instructions for providing commerce leads to an agent is provided. The computer-readable medium comprises instructions for identifying an independent agent that is available for processing a transaction, determining whether the independent agent is authorized to process the transaction, and in response to determining the independent agent is authorized, evaluating a credit balance associated with the independent agent to determine if the independent agent has a sufficient credit balance for processing the transaction.

In a further embodiment of the disclosure, a system for providing commerce leads to an agent is provided. The system comprises a call center front office including a virtual automatic call distributor adapted to forward calls to an agent selected from a plurality of agents, a telemarketing agent station communicatively coupled with the call center, an interface to a carrier network for receiving a call from a consumer, and a management server that maintains a management database that stores a record allocated for an independent agent, wherein the virtual automatic call distributor is adapted to determine that the independent agent is available for processing the call, determine whether the independent agent is authorized to process the transaction, and in response to determining the independent agent is authorized, evaluate a credit balance in the record to determine if the independent agent has a sufficient credit balance for processing the call.

BRIEF DESCRIPTION OF THE DRAWINGS

Aspects of the present disclosure are best understood from the following detailed description when read with the accompanying figures, in which.

DETAILED DESCRIPTION OF THE INVENTION

It is to be understood that the following disclosure provides many different embodiments or examples for implementing different features of various embodiments. Specific examples of components and arrangements are described below to simplify the present disclosure. These are, of course, merely examples and are not intended to be limiting.

In accordance with embodiments, mechanisms for authorization of independent agents for processing calls and distribution of calls to authorized agents are provided. An independent agent may purchase or otherwise acquire credits for leads related to commerce transactions. The credits may be maintained by a call center and accessed by a VRU, a virtual automatic call distributor, or other device responsible for routing calls to agents. Calls or other transactions leads may then be directed to the independent agent, and the independent agent's credits may be deducted accordingly.

Figure 1:
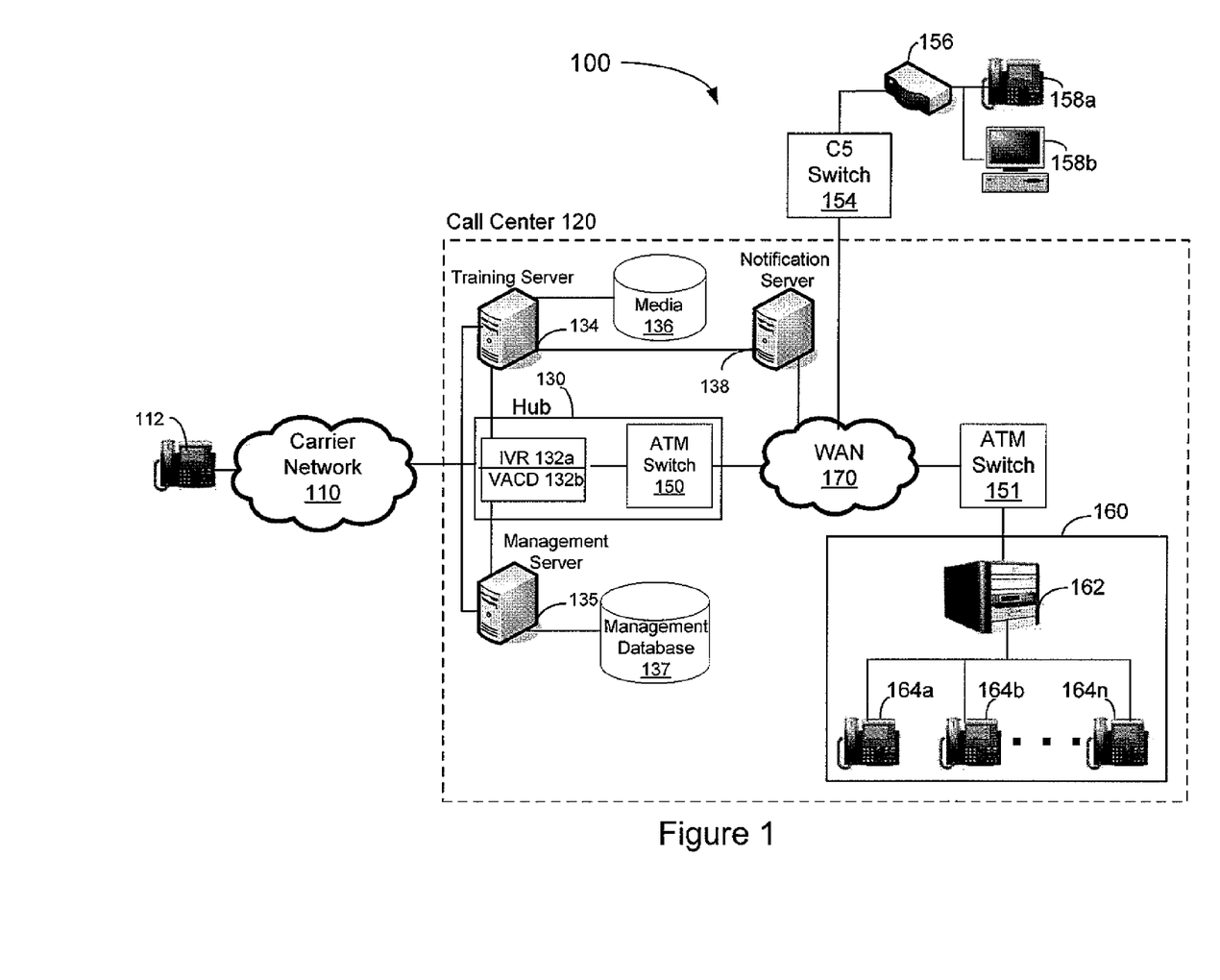
FIG. 1 is diagrammatic representation of a system that facilitates providing leads to agents in accordance with an embodiment of the invention.

Now referring to FIG. 1, a system 100 that facilitates providing leads to agents in accordance with an embodiment of the invention is depicted. In the depicted system configuration, a call from a customer device 112 is delivered to a hub 130 of a call center 120 by a carrier network 110. The call may be received by a voice response unit (VRU) 132a deployed at hub 130, and numerous VRUs may be deployed in hub 130. Voice response units are known in the art, and the details of the operation of the VRU will not be explained herein. Briefly, VRU 132a is a telecommunications computer, also called an Interactive Voice Response (IVR) unit, that responds to caller entered touch-tone digits and/or to the caller's voice in much the same way that a conventional computer responds to keystrokes or mouse clicks. VRU 132a may play digitally recorded speech that provides menu selections to the caller. The caller then enters the touch-tone digits that correspond to the desired menu selection or provides a voice response. The caller entered digits or voice commands can invoke options as varied as looking up account balances, moving the call within or to another system component, obtaining preliminary information from a caller, or playing a pre-recorded announcement for the caller. In a typical call center, the function of the VRU is to obtain preliminary call information, such as the caller's identity, customer information, preliminary transaction data, or the like. Hub 130 may also feature a virtual automatic call distributor (VACD) 132b. VACD 132b comprises an application that distributes incoming calls to a specific group of terminals that agents use or to a specific terminal of an agent. VACD 132b provides call routing based upon, for example, the availability of operators located at the remote sites or other call-routing decision criteria. VRU 132a and VACD 132b are collectively referred to herein as VRU/VACD 132.

When the call is delivered by the carrier, the dialed number is available through the carrier's Dialed Number Information Service (DNIS), and the calling telephone number is available by use of Automatic Number Identification (ANI). Automated or semi-automated intelligent call processing may be made available by either or both of the ANI or DNIS provided by the carrier. After the call is processed at VRU 132a of hub 130, VRU 132a may create a connection to a switch deployed in hub 130. As part of the process, VRU 132a may assign an internal DNIS that associates the call with its destination at the proper remote location, e.g., a call center agent station or an independent agent. The internal DNIS associated with the call by VRU 132a is used by the system to route the call to its proper destination.

After the call has been processed at the hub VRU and VACD, it is connected to a programmable hub switch by, for example, T1 voice trunk lines that in turn may route the call to an ATM switch 150 deployed in hub 130 by way of, for example, T1 voice trunk lines. ATM switch 150 provides a connection from hub 130 to the connectivity member, e.g., a wide area network (WAN) 170, for transmission of the call to the destination. In the illustrative example, the ATM transmission may terminate at an ATM switch 151 that interfaces with a call center back end 160, e.g., via a private branch exchange 162, that includes various call center stations including call center telephony devices 164a-164n operated by respective telemarketing agents. Additionally, an independent remote agent at a remote location may interface with WAN 170, e.g., via a remote telephony device 158a and/or remote client station 158b (collectively referred to as agent station 158), e.g., via a router 156 communicatively coupled with an end office or class 5 switch 154 through which access to WAN 170 is made. The hub ATM switch 150 may use the internal DNIS associated with the call to route the call to its proper remote location based upon previously defined software control.

IVR/VACD 132 may be communicatively coupled with a training server 134 that interfaces with a media source 136. Media source 136 may maintain and provide various media, such as one or more sales leads or information pertaining thereto. In other embodiments, training server 134 may provide a set of data that is used to make a media buying decision. Further, training server 134 may sort and purchase the media obtained from media source 136. In still another embodiment, media source 136 may bid or compete for media, such as an advertisement, to be delivered to training server 134. Additionally, IVR/VACD 132 may be communicatively coupled with a management server 135 that interfaces with a management database 137. In accordance with an embodiment, management database 137 may maintain records allocated to respective independent agents that maintain lead credits indicating a number of commerce leads available to particular independent agents. Additionally, a notification server 138 may interface with training server 134 and WAN 170 for providing various notifications to telemarketing agents and/or independent agents as described more fully hereinbelow.

System 100 depicts a simplified exemplary network in which embodiments of the invention may be implemented and is provided only to facilitate an understanding of the disclosed embodiments. For example, WAN 170 may be implemented on any variety of data link and physical layer network infrastructure rather than ATM as depicted in FIG. 1. FIG. 1 is intended as an example, and not as an architectural limitation, of embodiments described herein.

In accordance with an embodiment, an independent agent may be authorized by system 100 to provide processing of calls inbound to a call center. The independent agent may purchase or otherwise acquire credits for leads related to commerce transactions. The credits may be maintained by a call center, e.g., by management database 137, and accessed by a virtual automatic call distributor. If it is determined that the remote independent agent has sufficient credits for a call or other commerce lead, the call may be routed to the independent agent. Credits allocated to the independent remote agent may be deducted accordingly.

Figure 2:
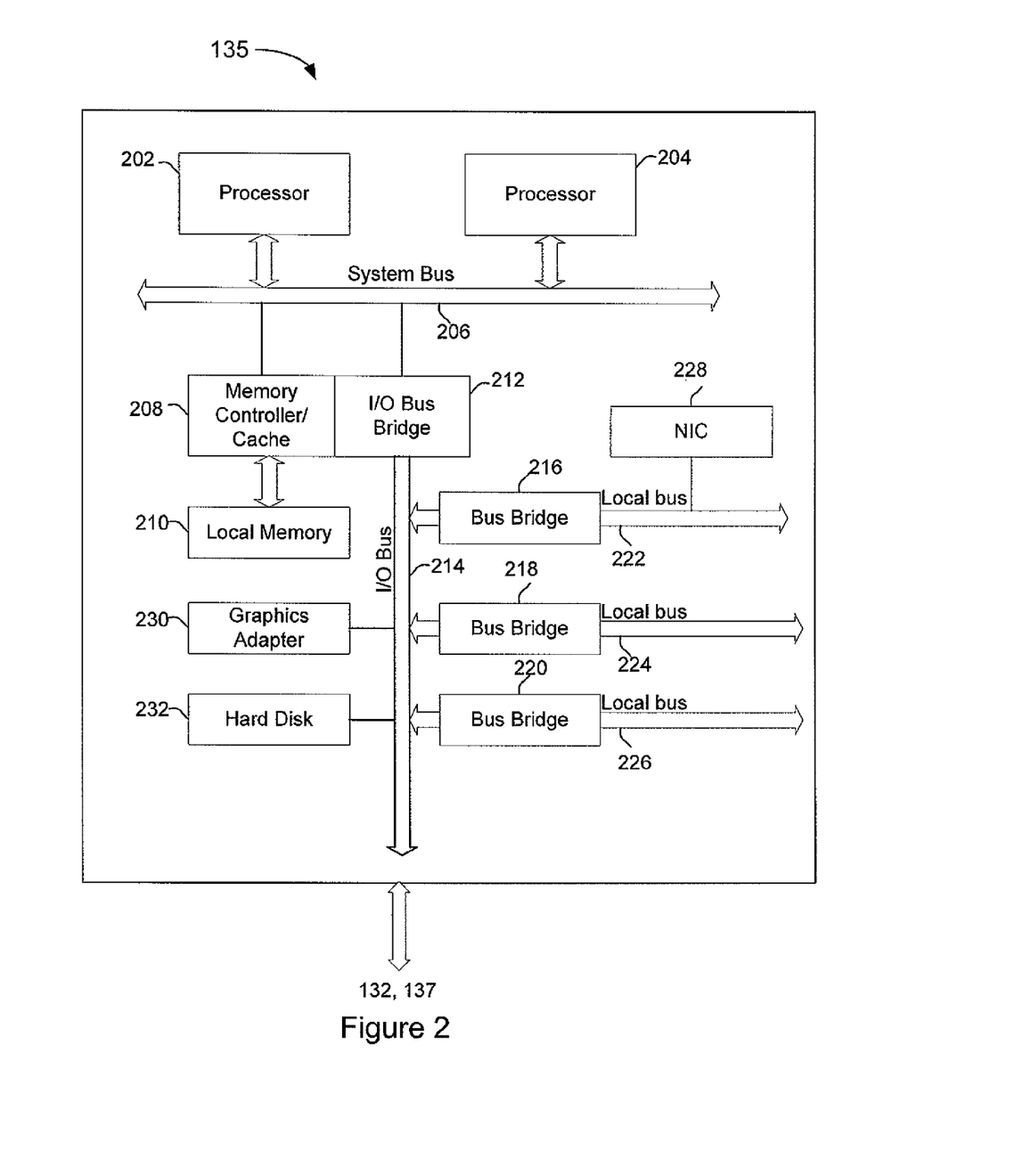
FIG. 2 is a diagrammatic representation of an exemplary embodiment of computer system depicted in FIG. 1.

FIG. 2 is a diagrammatic representation of an exemplary embodiment of management server 135 depicted in FIG. 1. Code or instructions implementing procedures for processing leads according to embodiments disclosed herein may be located or accessed by management server 135.

System 135 may be implemented as a symmetric multiprocessor (SMP) system that includes a plurality of processors 202 and 204 connected to a system bus 206, although other single-processor or multi-processor configurations may be suitably substituted therefor. A memory controller/cache 208 that provides an interface to local memory 210 may also be connected with system bus 206. An I/O bus bridge 212 may connect with system bus 206 and provide an interface to an I/O bus 214. Memory controller/cache 208 and I/O bus bridge 212 may be integrated into a common component.

A bus bridge 216, such as a Peripheral Component Interconnect (PCI) bus bridge, may connect with I/O bus 214 and provide an interface to a local bus 222, such as a PCI local bus. Communication links to other network nodes of system 100 in FIG. 1 may be provided through a network interface card (NIC) 228 connected to local bus 222 through add-in connectors. Additional bus bridges 218 and 220 may provide interfaces for additional local buses 224 and 226 from which peripheral or expansion devices may be supported. A graphics adapter 230 and hard disk 232 may also be connected to I/O bus 214 as depicted.

An operating system may run on processor system 202 or 204 and may be used to coordinate and provide control of various components within system 135. Instructions for the operating system and applications or programs are located on storage devices, such as hard disk drive 232, and may be loaded into memory 210 for execution by processor system 202 and 204.

Those of ordinary skill in the art will appreciate that the hardware depicted in FIG. 2 may vary. The depicted example is not intended to imply architectural limitations with respect to implementations of the present disclosure, but rather embodiments disclosed herein may be run by any suitable data processing system.

Embodiments disclosed herein provide mechanisms for providing sales leads to an agent, and more specifically to providing and/or processing real-time lead opportunities to an independent agent in return for some form of compensation. Initially, an agent, such as an independent agent, may complete a certification process which may involve one of the following steps: taking an assessment test, agreeing to a background check, and the like, partaking in a training course to learn how to properly process incoming communications (such as voice, data, and multimedia). If the agent is successfully certified, an optional supplementary assessment test may be provided to the agent. Communications provided to the agent may include a link that the agent can use to access a first server. In other embodiments, a certification process may not be required.

Figure 3:
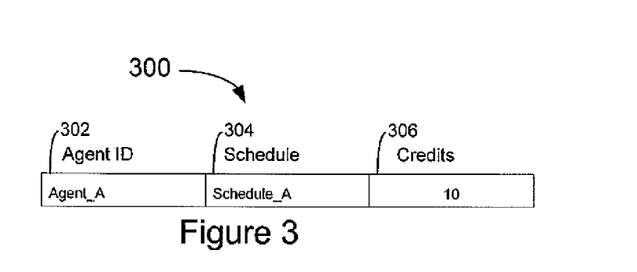
FIG. 3 is a diagrammatic representation of a management database record associated with an independent agent that facilitates lead processing in accordance with embodiments of the present invention.

FIG. 3 is a diagrammatic representation of a management database record 300 associated with an independent agent that facilitates lead processing in accordance with embodiments of the present invention.

Record 300 comprises fields 302-306 that have a respective label, or identifier, that facilitates insertion, deletion, querying, or other data operations or manipulations of record 300. In the illustrative example, fields 302-306 have respective labels of "Agent ID", "Schedule", and "Credits".

In the illustrative example, Agent ID field 302 maintains a data element uniquely assigned to an independent agent for identification purposes of the agent. In the illustrative example, the agent ID is represented as "Agent_A". The agent ID may comprise, for example, the name of the agent, an identifier such as a social security number, a unique identifier generated in system 100 that is assigned to the agent, or another suitable identifier. Schedule field 304 may store one or more data elements that specify a schedule for which the agent identified in Agent ID field 302 is scheduled to work. In the present example, the schedule specified by Schedule field 304 is represented as "Schedule_A". The data elements(s) of Schedule field 304 may specify days of the week, hours of the day, or other data indicative of a work schedule. Credits field 306 may store a data element, such as an integer value, that specifies the number of leads (or other telemarketing account accruals) credited to the agent specified in Agent ID field 302. In the present example, the credits amount allocated to "Agent_A" is represented as "10", e.g. thereby indicating that the agent has 10 remaining lead credits. Other fields specifying various information, such as information regarding the agent's history, revenue, sales, credit, ability to pay, expertise, age, sex, and the like may additionally be included in record 300.

Figure 4:
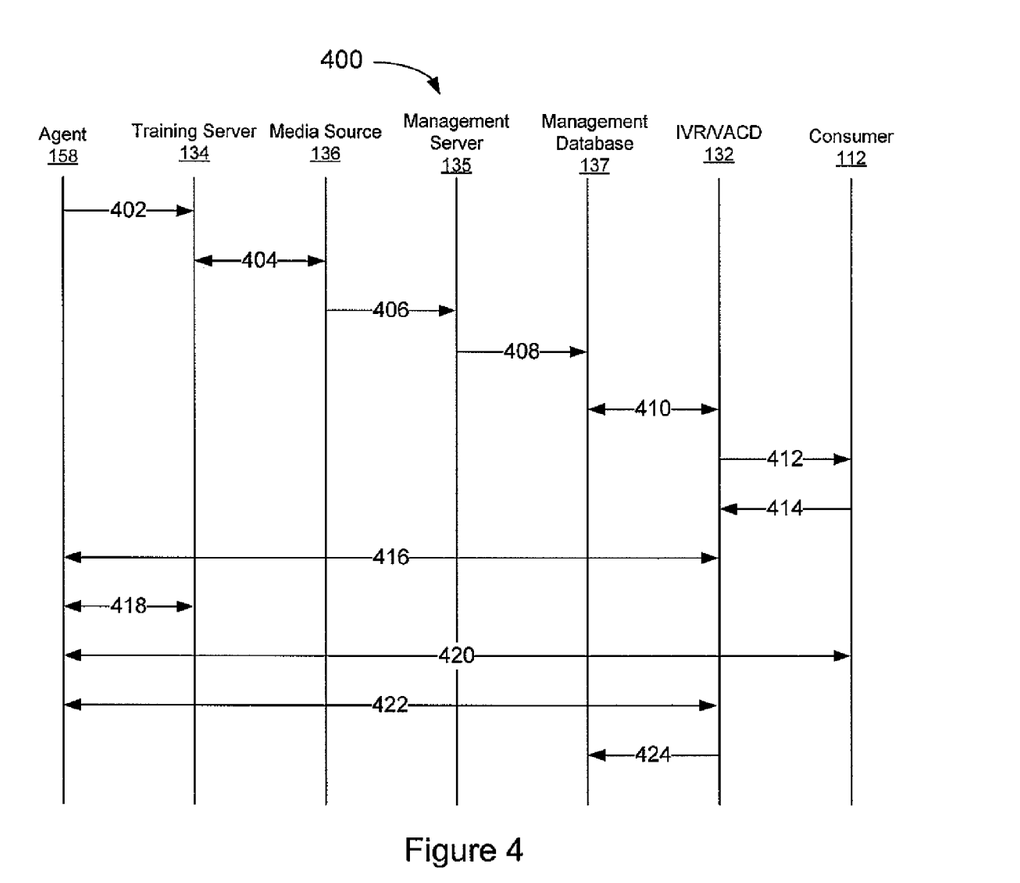
FIG. 4 is a diagrammatic representation of an exemplary messaging flow that facilitates providing leads to an independent agent in accordance with an embodiment of the present invention.

FIG. 4 is a diagrammatic representation of an exemplary messaging flow 400 that depicts communication exchanges that facilitate providing leads to an independent agent in accordance with an embodiment of the present invention.

An agent, e.g., an independent agent operating at station 158, sends training server 134 an agreed upon criteria (such as a monetary amount) in exchange for an asset, such as telemarketing calls, sales leads, or the like (step 402). The criteria, such as a monetary amount, may be exchanged between the agent and the training server via, for example, a credit card transaction or another suitable monetary exchange.

Training server 134 may in turn purchase media from one or more media sources 136 (step 404). The media may comprise, for example, one or more commerce leads, a particular number of telemarketing calls that are to be allocated for the agent, or other leads. In other embodiments, training server 134 may provide a set of data that is used to make a media buying decision. Further, training server 134 may sort and purchase the media obtained from media source 136. In still another embodiment, media source 136 may bid or compete for media, such as an advertisement, to be delivered to training server 134.

Training server 134 then provides information regarding the monetary amount provided by the agent and information regarding the agent to management server 135 (step 406).

Server 135 may then process the lead credit and debit related to the transaction. In other embodiments, training server 134 may provide information regarding other criteria with or without the monetary amount to management server 135. The criteria for the information conveyed from training server 134 to management server 135 may be set by, for example, training server 134, server 135, a company or other entity producing the media, a company or other entity owning the media, another suitable entity, or any combination thereof. For example, the company producing the media and/or the company owning the media (which may be the same company) and training server 134 (which may be owned and/or controlled by a marketer) may agree that training server 134 will buy the media when a certain number of independent agents bid a predefined dollar amount and/or if the independent agents are located in a particular geographic region. The media may run on various mediums and at various times. Thus, a national media campaign may not be needed. Other criteria relating to the independent agents, such as the agent's history, revenue, sales, credit, ability to pay, expertise, age, sex, and the like, may be conveyed to server 135 and may be used for processing the transaction.

Management server 135 may send information to workforce management database 137 that provides workforce management functionality (step 408). The information sent to workforce management database 137 for storage thereby preferably includes a specification of the calls or other credits that are purchased by the agent, called credits, or other lead purchases acquired by the agent transaction.

Workforce management database 137 and IVR/VACD 132 may be communicatively coupled for exchange of communications (step 410) related to available credits associated with an agent. For example, workforce management database 137 may notify IVR/VACD 132 that the agent is scheduled at a particular date and time. In other embodiments, IVR/VACD 132 may send independent agents a communication (such as a text message) instructing the agent to make a call. As such, an independent agent may not be required to sign up for a particular scheduled work time with management database 137.

Media may then be communicated to a consumer, such as a consumer calling into the telemarketing system from consumer device 112 e.g., for viewing, audio playback or other media consumption thereby (step 412). In other embodiments, the consumer may not have the media communicated thereto but, rather, may have an indication that the media is available for playback. For example, the consumer may be provided with a telephone number that the consumer may dial for audio playback of the media, a link to a website at which media may be transferred to the consumer for playback, or by another mechanism.

The consumer may then be connected with an intelligent switching device, such as IVR/VACD 132 (step 414). The independent agent may have previously logged onto IVR/VACD 132 based on the agents schedule. The agent may then log into IVR/VACD 132 (step 416) based on the schedule date and time (or by directly connecting to IVR/VACD 132) and accesses training server 134 (step 418) to receive information necessary to process the lead.

The consumer may be routed to the independent agent by IVR/VACD 132 and network switching equipment based on one or more criterion, such as an availability of the independent agent, an amount of revenue produced by the agent, an amount of product or services sold by the agent, a geographic location of the agent, an experience level of the agent, a type of product or service, and the like (step 420). In other embodiments, an agent may directly connect (or can connect via a third party) when presented with the lead. Further, both parties may be adapted to communicate via instant messaging, chat, etc.

Alternatively, if an independent agent is not utilized or available for any reason, IVR/VACD 132 may route the call to a telemarketing representative, such as a telemarketing agent located in telemarketing center 160, to an IVR, to another independent agent, or to an alternate location. Moreover, the call may be placed on hold until the agent is available, text messages or other notification messages may be sent to a plurality of agents not logged into the system that directs the agents to log onto the system.

If the consumer makes a purchase from the agent, information related to the purchase may be sent to IVR/VACD 132 for further processing (step 422). In other embodiments, some information on an agreed upon set of elements that if changed as a result of the communications may result in a change to the criteria of training server 134 via the IVR or other module. As such, data changes may be picked up on a separate server that then updates the media source 136 and/or training server 134. In some embodiments, information related to the purchase may be sent to IVR/VACD 132 for further processing and ranking of the agent to determine future delivery criteria. Accordingly, IVR/VACD 132 may then update management database 137 with a new credit balance (step 424). For example, the credit amount stored in Credits field 306 may be deducted. The connection may be terminated when the lead balance is exhausted and/or an existing communication is complete.

Figure 5:
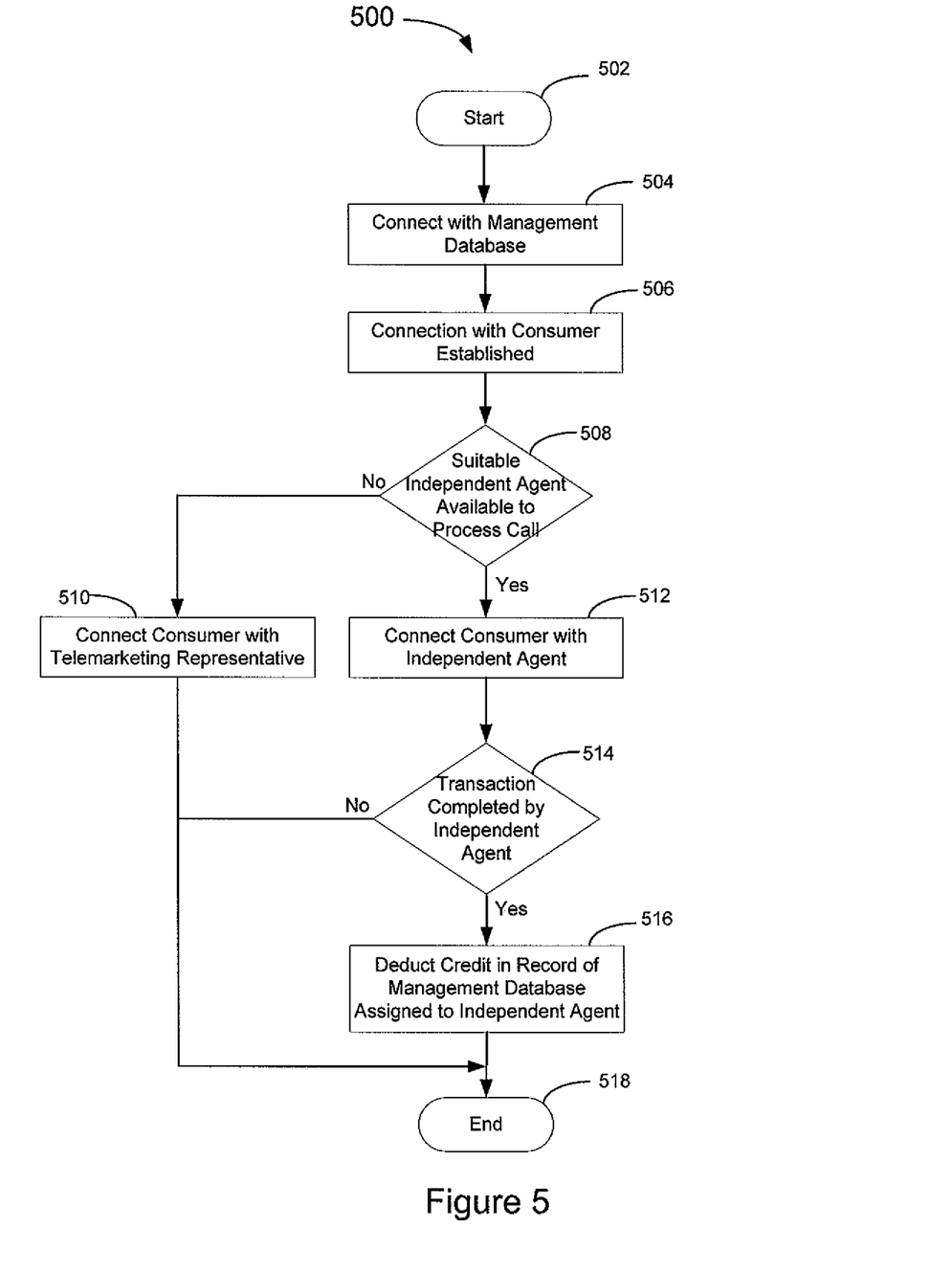
FIG. 5 is a flowchart that depicts processing of an interactive voice response system/virtual automatic call distributor that facilitates transaction processing by independent agents in accordance with an embodiment.

FIG. 5 is a flowchart 500 that depicts processing of an IVR/VACD that facilitates call processing by independent agents in accordance with an embodiment.

The IVR/VACD routine is invoked (step 502), and a connection may be established with management database 137 (step 504). A consumer may then connect with IVR/VACD 132 (step 506), e.g., by placing a call into system 100 that is received at IVR/VACD 132. An evaluation may then be made to determine if a suitable independent agent is connected with IVR/VACD 132 for processing the consumer call (step 508). For example, an evaluation of any independent agents connected with IVR/VACD 132 may be made to determine if any independent agent is suitably trained for processing the call and has sufficient credits for receiving the call. If no independent agent is identified for receiving the call, the call may be forwarded to a telemarketing agent (step 510), e.g., an agent located at telemarketing center 160, and the IVR/VACD processing cycle may then end (step 518).

If an independent agent suitable for processing the call is identified at step 508, the independent agent may be connected with the consumer (step 512). An evaluation may subsequently be made to determine if the independent agent completed a transaction with the consumer (step 514). If the transaction was not completed by the independent agent, the IVR/VACD processing cycle may end according to step 518. If the transaction was completed by the independent agent, a credit may be deducted from the record allocated for the independent agent in management database 137 (step 516), and the IVR/VACD processing cycle may end according to step 518.

In accordance with another embodiment, mechanisms for notifying skilled labor, such as telemarketing agents, independent agents, or the like, of a need for services is provided. Skilled labor may be notified via an automated notification technology when time is available to be purchased or time is available to be scheduled. For example, notification server 138 depicted in FIG. 1 may be communicatively coupled with training server 134. When media time, such as call processing credits or the like, is purchased by training sever 134, a notification may be transmitted from training server 134 to notification server 138 that indicates credits are available to be purchased. Notification server 138 may, in turn, provide notifications to skilled labor, such as a plurality of independent agents, that time or commerce credits is available to be purchased. This notification may comprise, for example, a global announcement to a skilled workforce that labor time is needed.

Skilled labor may be notified via automated notification technology, such as email, voice mail, or the like, when monetary incentives have been added or adjusted in order to encourage labor/agents to agree to work. For example, the notification sent to the skilled labor force may indicate that the cost of time or commerce credits has been reduced, or that each call processed by the labor will be decremented at a reduced credit rate. The notification may be sent when "premium" hours are added to system. This notification may only occur when incentives are added or changed. Conversely, in another embodiment, a notification may be provided to the skilled labor force that a reduction in labor is currently desired and incentives may thus be provided via the notification for the skilled labor to not work.

In another embodiment, notification server 138 may transmit a notification to a skilled labor force when staffing deficits hit a specified percentage of a required workforce. The intent of the notification in this embodiment is to encourage agents to work during a specific interval to address a staffing deficit. This notification may only be transmitted, for example, when the work force server 138 identifies a scheduled workforce to required workforce threshold has been breached.

In accordance with another embodiment, the skilled labor work force may be notified of a work force need when the notification server recognizes a trend in specific intervals that have been characterized as under-serviced, e.g., a scheduled labor to actual worked labor threshold being breached. In this event, notification server 138 may provide a notification that encourages scheduled labor to comply with a previously agreed upon work schedule. For example, a work force evaluation routine may identify a six week trend in low schedule adherence, and may transmit a message to notification server 138 reflecting the low schedule adherence. Notification server 138 may accordingly provide a notification to the skilled workers who are scheduled during the identified interval. The notification is sent to the labor in an effort to improve overall schedule adherence.

In accordance with another embodiment, skilled labor may be notified in advance, e.g., one to twenty-four hours, via notification server 138 that the skilled labor is scheduled to work during an upcoming period. In this implementation, the notification is provided to improve global schedule adherence of the workforce. This notification mechanism may be implemented as a global notification to all labor or agents that are scheduled to work the particular interval for which the notification is valid.

The various notification messages may be provided by any one or more of phone messages, email, voicemail, text, chat, or another suitable notification mechanism.

As described, mechanisms for authorization of independent agents for processing calls and distribution of calls to authorized agents are provided. An independent agent may purchase or otherwise acquire credits for leads related to commerce transactions. The credits may be maintained by a call center and accessed by a VRU, a virtual automatic call distributor, or other device responsible for routing calls to agents. Calls or other transactions leads may then be directed to the independent agent, and the independent agent's credits may be deducted accordingly.

The flowchart of FIG. 5 depicts process serialization to facilitate an understanding of disclosed embodiments and is not necessarily indicative of serialization of the operations being performed. In various embodiments, the processing steps described in FIG. 5 may be performed in varying order, and one or more depicted steps may be performed in parallel with other steps. Additionally, execution of some processing steps of FIG. 5 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single processor or multiple processors. Additionally, various steps of embodiments of the invention may provide one or more data structures generated, produced, received, or otherwise implemented on a computer-readable medium, such as a memory.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method, comprising:
performing, by a computer processor and memory,
identifying an agent that is available for processing a purchase transaction for an item;
determining that the agent is authorized to process the transaction;
in response to determining that the agent is authorized, evaluating a credit balance associated with the agent and determining that the agent has a sufficient credit balance to process the transaction;
routing a connection to the agent in response to determining that the agent has the sufficient credit balance; and
determining that the agent has successfully processed the transaction and in response deducting an amount from the credit balance associated with the agent.

2. The method of claim 1, wherein identifying the agent comprises determining the agent is connected with a hub having the computer processor and memory.

3. The method of claim 1, comprising connecting the agent and a consumer.

4. The method of claim 1, comprising terminating a call originated by a consumer with the computer processor and memory operated by the agent.

5. The method of claim 1, wherein the computer processor and memory is at least one of: a virtual automatic call distributor and a voice response unit.

6. The method of claim 1, wherein the agent is at least one of an independent agent and a non-independent agent.

7. The method of claim 1, comprising purchasing, by the agent, an amount of credits allocated to the credit balance.

8. The method of claim 1, comprising informing the agent of a time period when transactions may be processed by the agent at a reduced credit deduction amount.

9. The method of claim 1, comprising indicating when a time period is understaffed and for which transactions are available to be processed.

10. A non-transitory computer-readable medium having computer-executable instructions for execution by a processing system, the computer-executable instructions for:
identifying an agent that is available for processing a purchase transaction for an item;
determining that the agent is authorized to process the transaction;
in response to determining that the agent is authorized, evaluating a credit balance associated with the agent and determining that the agent has a sufficient credit balance to process the transaction;
routing a connection to the agent in response to determining that the agent has the sufficient credit balance; and
determining that the agent has successfully processed the transaction and in response deducting an amount from the credit balance associated with the agent.

11. The computer-readable medium of claim 10, wherein the instructions for identifying an agent further comprise instructions for determining the agent is connected with a hub having a device.

12. The computer-readable medium of claim 10, wherein the computer-readable medium further comprising instructions for connecting the agent and the consumer.

13. The computer-readable medium of claim 12, wherein the consumer is connected with the device, and wherein the instructions for connecting the agent and the consumer further comprise instructions for terminating a call originated by the consumer with a device operated by the agent.

14. The computer-readable medium of claim 12, wherein the device comprises at least one of: a virtual automatic call distributor and a voice response unit.

15. The computer-readable medium of claim 12, wherein the agent is at least one of an independent agent and a non-independent agent.

16. The computer-readable medium of claim 10, comprising instructions for purchasing, by the agent, an amount of credits allocated to the credit balance.

17. A system, comprising:
a call center including a device;
an agent station communicatively coupled with the call center;
wherein the device is configured to maintain a connection with a consumer and during the connection:
determine that the agent is authorized to process a transaction;
in response to a determination that the agent is authorized, evaluate a credit balance associated with the agent and determine that the agent has a sufficient credit balance to process the transaction;
route the connection to the agent in response to the determination that the agent has the sufficient credit balance; and
deduct an amount from the credit balance associated with the agent in response to a determination that the agent has successfully processed the transaction.

18. The system of claim 17, wherein the device determines the agent is available by a determination that the agent has connected with the call center.

19. The system of claim 17, wherein the device terminates the call with the agent.

20. The system of claim 17, wherein the agent purchases an amount of credits allocated to the credit balance.

* * * * *